United States Patent
Takeda et al.

(10) Patent No.: US 10,198,621 B2
(45) Date of Patent: Feb. 5, 2019

(54) IMAGE-PROCESSING DEVICE AND METHOD FOR FOREGROUND MASK CORRECTION FOR OBJECT SEGMENTATION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 15/361,723

(22) Filed: Nov. 28, 2016

(65) Prior Publication Data

US 2018/0150955 A1 May 31, 2018

(51) Int. Cl.
*G06K 9/00* (2006.01)
*G06T 7/11* (2017.01)
(Continued)

(52) U.S. Cl.
CPC ..... *G06K 9/00228* (2013.01); *G06K 9/00362* (2013.01); *G06T 7/0081* (2013.01); *G06T 7/11* (2017.01); *G06T 7/194* (2017.01); *G06T 2207/10004* (2013.01); *G06T 2207/10016* (2013.01); *G06T 2207/10028* (2013.01);
(Continued)

(58) Field of Classification Search
CPC ......... G06T 7/0081; G06T 2207/10004; G06T 7/194; G06T 7/11; G06T 2207/20224; G06T 2207/30196; G06T 2207/10028; G06T 2207/10016; G06K 9/00228; G06K 9/00362
See application file for complete search history.

(56) References Cited

U.S. PATENT DOCUMENTS

| 7,418,113 | B2 | 8/2008 | Porikli et al. |
| 8,345,102 | B2 | 1/2013 | Huang et al. |

(Continued)

FOREIGN PATENT DOCUMENTS

| JP | 2003-317096 A | 11/2003 |
| JP | 2006-527443 A | 11/2006 |

(Continued)

OTHER PUBLICATIONS

Bleiweiss, et al., "Fusing Time-of-Flight Depth and Color for Real-Time Segmentation and Tracking", R. Koch and A. Kolb (Eds.): Dyn3D 2009, LNCS 5742, Springer-Verlag Berlin Heidelberg 2009, pp. 58-69.

Liang, et al.,"A Refinement Framework for Background Subtraction Based on Color and Depth Data", National University of Defense Technology College of Computer 978-1-4673-9961-6/16, ICIP2016, pp. 271-275.

(Continued)

*Primary Examiner* — Jon Chang
(74) *Attorney, Agent, or Firm* — Chip Law Group

(57) ABSTRACT

An image-processing device and method for foreground mask correction for object segmentation, includes receipt of a sequence of image frames. A first FG mask is estimated using depth information associated with the input image frame and by binarizing a difference between the input image frame and a background (BG) image of the input image frame. A first set of pixels with a first mask value to be updated to a second mask value is identified in a boundary region of the estimated first FG mask. A second FG mask is determined based on the identification of the first set of pixels in the boundary region of the estimated first FG mask.

21 Claims, 4 Drawing Sheets

(51) Int. Cl.
    *G06T 7/194*    (2017.01)
    *G06T 7/00*     (2017.01)

(52) U.S. Cl.
    CPC .............. *G06T 2207/20224* (2013.01); *G06T 2207/30196* (2013.01)

(56) References Cited

U.S. PATENT DOCUMENTS

| 8,565,525 | B2* | 10/2013 | Rossato | G06K 9/38 |
| | | | | 382/173 |
| 8,620,028 | B2 | 12/2013 | Eaton et al. | |
| 2010/0067782 | A1* | 3/2010 | Dunn | G06T 11/001 |
| | | | | 382/162 |
| 2014/0347475 | A1 | 11/2014 | Divakaran et al. | |

FOREIGN PATENT DOCUMENTS

| JP | 2013-244047 A | 12/2013 |
| JP | 2014-164579 A | 9/2014 |

OTHER PUBLICATIONS

Guo, et al., "An Interactive Adaptive System for Semantic Object Extraction from Image Sequences", Part of the SPIE Conference on Applications of Digital Image Processing XXII, Denver, Colorado, SPIE vol. 3808, Jul. 1999, pp. 580-591.

Wang, et al., "Image and Video Segmentation by Anisotropic Kernel Mean Shift", T. Pajdla and J. Matas (Eds.): ECCV 2004, LNCS 3022, Springer-Verlag Berlin Heidelberg 2004, pp. 238-249.

Hou et al., "Automated People Counting at a Mass Site", Proceedings of the IEEE International Conference on Automation and Logistics, 978-1-4244-2503-7/08/, Sep. 2008, pp. 464-469.

Extended European Search Report of EP Patent Application No. 17200201.6, dated Jan. 3, 2018, 14 pages.

C. Beleznai et al., "Human Tracking by Fast Mean Shift Mode Seeking", Journal of Multimedia, vol. 1, No. 1, Apr. 2006, pp. 8.

Office Action for JP Patent Application No. 2017-219758, dated 2018, 5 pages of Office Action and 4 pages of English Translation.

Miyashita, et al., "Fast and Accurate Image Segmentation Technique using Multiple Sensors", The Institute of Electronics, Information and Communication Engineers technical report, vol. 116, Issue 63, MVE2016-1, Jun. 2006, 17-22 pages.

\* cited by examiner ively as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

IMAGE-PROCESSING DEVICE AND METHOD FOR FOREGROUND MASK CORRECTION FOR OBJECT SEGMENTATION

CROSS-REFERENCE TO RELATED APPLICATIONS/INCORPORATION BY REFERENCE

None.

FIELD

Various embodiments of the disclosure relate to image processing for object segmentation. More specifically, various embodiments of the disclosure relate to an image-processing device and method for foreground (FG) mask correction for object segmentation.

BACKGROUND

Recent advancements in the field of video surveillance systems, machine vision systems in the field of robotics and automotive industry, and consumer electronic (CE) devices are largely due to rapid technological developments in image processing techniques. One such image processing techniques is image segmentation, which may refer to the partitioning of an image into several regions based on certain rules. Although various segmentation methods have been known to separate foreground objects from the background of an image or a video, the complexity, accuracy, and computational resource requirements vary based on the objective to be achieved.

In conventional video segmentation methods, a common approach to segment a foreground object is to subtract a pre-determined static background image from a newly captured image. The remaining pixels after subtraction may be labeled as foreground. The pre-determined static background image may be a completely static background image generated at the start of the video segmentation process. A user may capture a plurality of images of a background scene with an image capture device and take an average of the plurality of images to generate the completely static background image. Therefore, during generation of the pre-determined static background image, the user may need to assure that no moving objects (including the user) are present in the captured scene. Further, if the image capture device is displaced from its original position, the static background image may need to be generated again, which may be cumbersome. Currently, another approach to segment the foreground object is to use depth information from a depth sensor. However, because of the severe noise present in most depth sensors, the boundaries of the foreground object regions obtained that rely heavily on depth values are often not smooth. There may be some undesired holes within the foreground object regions as a result of the invalid depth values from the depth sensor.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image-processing device and method for foreground mask correction for object segmentation is provided sub-

DETAILED DESCRIPTION

Figure 1:
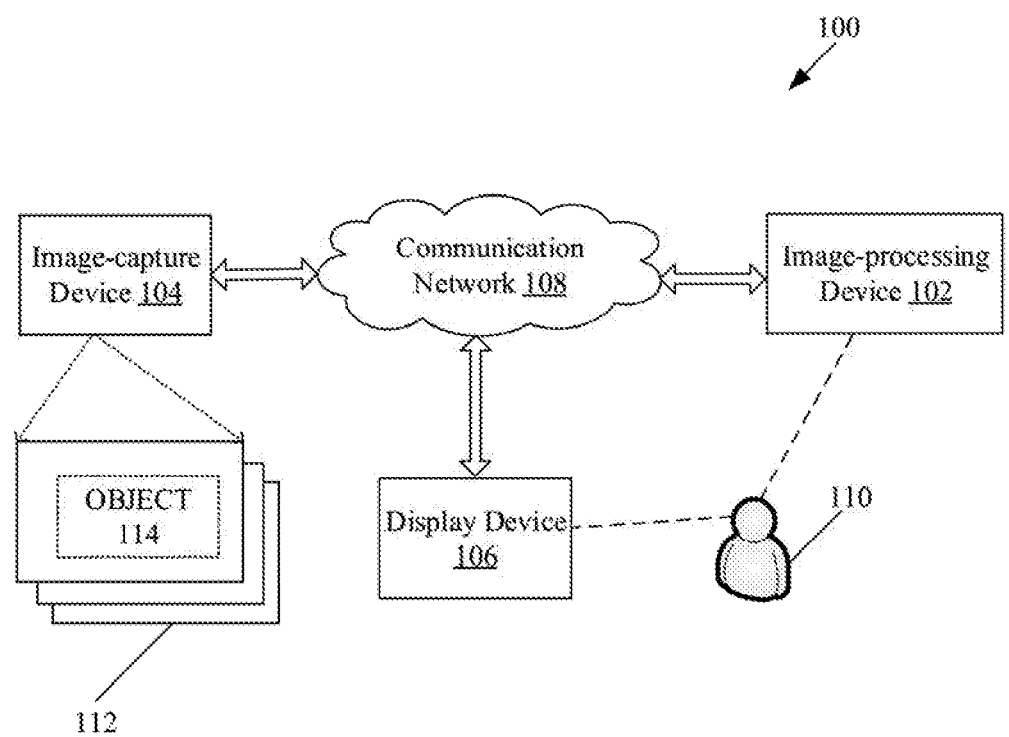
FIG. 1 is a block diagram that illustrates an exemplary network environment for foreground mask correction for object segmentation, in accordance with an embodiment of the disclosure.

Various implementations may be found in an image-processing device and method for foreground mask correction for object segmentation. Exemplary aspects of the disclosure may include a method that receives a sequence of image frames by an image-processing device from an image capture device. A first foreground (FG) mask of an object may be estimated in an input image frame of the received sequence of image frames. The first FG mask may be estimated by depth information associated with the input image frame. The first FG mask may be estimated by binarizing a difference between the input image frame and a background (BG) image of the input image frame. A first set of pixels with a first mask value to be updated to a second mask value may be identified in a boundary region of the estimated first FG mask. A second FG mask may be determined based on at least the identification of the first set of pixels in the boundary region of the estimated first FG mask.

In accordance with an embodiment, the input image frame may be segregated to a FG region and a BG region. The segregated BG region may correspond to the BG image. One or more FG regions to be removed from the segregated FG region may be detected based on a face detection and/or a human body detection technique for the estimation of the first FG mask.

In accordance with an embodiment, the first set of pixels may be identified by color components, a depth component, and a spatial position of each pixel associated with the boundary region. One or more FG mask correction parameters may be determined based on edge information derived from the input image frame. The identification of the first set of pixels is further based on the edge information derived from the input image frame.

In accordance with an embodiment, a mean shift filter may be applied to each boundary pixel of the boundary region for correction of mislabeled mask values associated with the estimated first FG mask for the determination of the second FG mask. A plurality of sample vectors may be utilized in a specified window size in a vicinity of the boundary region during application of the mean shift filter. The plurality of sample vectors may corresponds to the color components, the depth component, and the spatial position of each pixel associated with the boundary region. The spatial position of a pixel associated with the boundary region is specified by a vertical coordinate and a horizontal coordinate of the pixel.

In accordance with an embodiment, a kernel function with a first specified dimension may be selected for smoothing of the first FG mask of the object. The kernel function with the first specified dimension may be selected in an event that a first portion of the estimated first FG mask is located in a uniform region in the input image. The selection for smoothing of the first FG mask may be performed to enable the first portion of the estimated first FG mask to coincide with corresponding edges of the object derived from the input image frame. Further, the kernel function with a second specified dimension may be selected in an event that a second portion of the estimated first FG mask coincide with corresponding edges of the object derived from the input image frame.

In accordance with an embodiment, the second FG mask may be determined based on the identification of the first set of pixels in the boundary region of the estimated first FG mask. The object appearing in the sequence of image frames may be dynamically segmented in real-time or near real-time using the determined second FG mask of the object. The BG image may be periodically or aperiodically updated during the segmentation.

FIG. 1 is a block diagram that illustrates an exemplary network environment for FG mask correction for object segmentation, in accordance with an embodiment of the disclosure. With reference to FIG. 1, there is shown a network environment 100. The network environment 100 may include an image-processing device 102, an image-capture device 104, a display device 106, a communication network 108, and one or more users, such as a user 110. A sequence of image frames 112 captured by the image-capture device 104 is also shown. The sequence of image frames 112 may include one or more objects, such as an object 114. The image-processing device 102 may be communicatively coupled to the image-capture device 104, and the display device 106 via the communication network 108.

The image-processing device 102 may comprise suitable logic, circuitry, interfaces, and/or code that may be configured to receive a sequence of image frames from the image-capture device 104, via the communication network 108. The image-processing device 102 may be configured to estimate a first FG mask (such as an initial FG mask) of an object in an input image frame of the received sequence of image frames. The image-processing device 102 may be further configured to determine a second FG mask (such as a corrected FG mask) based on identification and correction of mask values of certain pixels in the boundary region of the estimated first FG mask. Examples of the image-processing device 102 may include, but are not limited to, a digital camera, a camcorder, a head-mounted device (HMD), a smartphone, a smart-glass, a laptop, a tablet, an augmented reality based device, a mainframe machine, a computing device, and/or other consumer electronic (CE) devices.

The image-capture device 104 may comprise suitable logic, circuitry, interfaces, and/or code that may be configured to capture the sequence of image frames. The image-capture device 104 may include an image-sensing circuitry that may enable capture of the sequence of image frames. The image-capture device 104 may comprise a viewfinder that may be configured to compose and/or focus a scene captured by the image-capture device 104. Examples of the image-capture device 104 may include, but not limited to at least a camera, a camcorder, an image sensor, and/or an action cam.

The display device 106 may comprise suitable logic, circuitry, interfaces, and/or code that may be configured to render the sequence of image frames received from the image-capture device 104. The display device 106 may be further configured to render the first FG mask and the second FG mask of the object. Examples of the display device 106 may include, but are not limited to, a display screen, a television (TV), a laptop, a tablet computer, a smartphone, and/or an optical head-mounted display device.

The communication network 108 may include a medium through which the image-processing device 102, the image-capture device 104, and the display device 106 may communicate with each other. Examples of the communication network 108 may include, but are not limited to, the Internet, a cloud network, a Long Term Evolution (LTE) network, a Wireless Fidelity (Wi-Fi) network, a wireless personal area network (WPAN), a Wireless Local Area Network (WLAN), a Local Area Network (LAN), a wireless wide area network (WWAN), a telephone line (POTS), and/or a Metropolitan Area Network (MAN). Various devices in the network environment 100 may be operable to connect to the communication network 108, in accordance with various wired and wireless communication protocols. The network environment 100 may also be referred to as a network environment 100. Examples of such wired and wireless communication protocols may include, but are not limited to, Transmission Control Protocol and Internet Protocol (TCP/IP), User Datagram Protocol (UDP), Hypertext Transfer Protocol (HTTP), Hypertext Transfer Protocol Secure (HTTPS), File Transfer Protocol (FTP), Zigbee, EDGE, infrared (IR), IEEE 802.11, 802.16, cellular communication protocols, and/or Bluetooth (BT) communication protocols, and/or variants thereof.

The sequence of image frames 112 refer to a video of a scene as viewed and captured by the user 110, by the image-capture device 104. The sequence of image frames 112 may include one or more objects, such as the object 114. In accordance with an embodiment, the object 114 may be an object-of-interest to be segmented from the sequence of image frames 112. Examples of the object 114 may include, but are not limited to a human object, an animal, or a non-human or inanimate object, such as a vehicle or a sports item.

In operation, the image-capture device 104 may be configured to capture the sequence of image frames 112. The image-capture device 104 may be an integrated unit of the image-processing device 102. Alternatively, the image-capture device 104 may be an external device. In such a case, the image-processing device 102 may receive the captured sequence of image frames 112 from the image-capture device 104, via the communication network 108. The captured sequence of image frames 112 may comprise one or more objects, such as the object 114 (a human and other non-human or inanimate objects).

The image-processing device 102 may be configured to segregate an input image frame of the received sequence of image frames 112 to a FG region and a BG region. The segregated BG region may also be referred to as a BG image. The image-processing device 102 may be configured to estimate a first FG mask of an object, such as a human object, in the input image frame. The first FG mask may be estimated by binarizing a difference between the input image frame and the BG image of the input image frame. Further, depth information associated with the input image frame may be used for the estimation of the first FG mask. The binarization may refer to converting a color image to a binary image, where a pixel may have two possible values, such as black and white. Thus, binarizing the difference between the input image frame and the BG image may also refer to subtracting the pixel values between the input image frame and the segregated BG region to obtain one or more FG masks.

Unlike the conventional depth-based object segmentation methods, the image-processing device 102 selectively uses the depth information from a depth sensor provided in the image-processing device 102. The image-processing device 102 selectively utilizes depth values for certain regions, where the depth values are considered reliable. For example, in the event the BG pixel values, such as color components (red, green, and blue) and depth values, are available for almost an entire scene, the generation of the first FG mask may be initiated. After the binarization of the difference between the input image frame and the BG image of the input image frame, the regions where the difference is larger than a specified threshold value, may be a first candidate FG mask(s). Alternatively stated, the first FG mask of the object 114 may be estimated based on the specified threshold value of the binarized difference between the input image frame and the BG image of the input image frame.

The image-processing device 102 may be further configured to detect one or more FG regions to be removed from the segregated FG region based on a face detection and/or a human body detection technique. For example, FG regions that correspond to objects other than human may be removed. The first FG mask may be selected from one or more other FG masks for further processing and FG mask correction. The selection of the first FG mask from the one or more FG masks of the FG region may be executed based on detection of face, human body, gesture, motion, shape, and/or edge. For example, in an event that the object to be detected and segmented in the sequence of image frames 112 is a human body, face detection and human body detection, or other type of recognition or detection technique may be utilized to reject the undesired FG regions from the segregated FG region. This process may provide an initial rough estimate of the candidate first FG mask, such as the human mask, from among the one or more FG masks of the FG region. The candidate first FG mask may be an initial FG mask, which may be processed to obtain an improved FG mask (such as a second FG mask). The improved FG mask may then be used as a template to find a similar object in a next image frame of the sequence of image frames 112 for an accurate object segmentation independent of any object boundary artifacts.

In accordance with an embodiment, each pixel in a boundary region of the estimated first FG mask may have a specific mask value, such as either a FG mask value or a BG mask value. The image-processing device 102 may be configured to identify a first set of pixels with a first mask value to be updated to the second mask value in the boundary region of the estimated first FG mask. The first mask value and the second mask value may correspond to one of the FG mask value and the BG mask value. The first set of pixels may be identified by color components, a depth component, and a spatial position of each pixel associated with the boundary region. The spatial position of a pixel associated with the boundary region may correspond to a vertical coordinate and a horizontal coordinate of the pixel. The identification of the first set of pixels may be further based on edge information derived from the input image frame.

In accordance with an embodiment, the image-processing device 102 may be configured to apply a mean shift filter to each boundary pixel of the boundary region for correction of mislabeled mask values associated with the estimated first FG mask. A plurality of sample vectors may be utilized in a specified window size in the vicinity of the boundary region during application of the mean shift filter. The plurality of sample vectors may correspond to the color components, the depth component, and the spatial position of each pixel associated with the boundary region.

In accordance with an embodiment, the image-processing device 102 may be configured to select a kernel function with a first specified dimension for smoothing of the first FG mask of the object 114. The kernel function with the first specified dimension may be selected in an event that a first portion of the estimated first FG mask is located in a uniform region, such as a flat area, in the input image. The selection of the kernel function with the first specified dimension for smoothing of the first FG mask may be performed to enable the first portion of the estimated first FG mask to coincide with corresponding edges of the object derived from the input image frame. Alternatively, a kernel function with a second specified dimension may be selected for smoothing of the first FG mask in an event that a second portion of the estimated first FG mask coincide with corresponding edges of the object derived from the input image frame.

In accordance with an embodiment, the image-processing device 102 may be configured to determine a second FG mask based on the identification of the first set of pixels in the boundary region of the estimated first FG mask. The second FG mask may be obtained based on the correction of the mislabeled mask values associated with the estimated first FG mask. In order to reduce the computational load of the first FG mask correction, the mean shift filter is applied specifically to a certain number of pixels next to the FG/BG boundary of the boundary region instead of the entire FG region of the image. For example, for each boundary pixel, the plurality of sample vectors are used in a small region of interest, for example, the specified window size of "11×11"-pixel may be used, so that the total number of samples (N) may be reduced, such as (N=121). As a result of the correction of the mislabeled mask values for pixels next to the FG/BG boundary in the specified window size, the second FG mask of the object may be quickly and accurately determined with reduced computational load on the image-processing device 102.

In accordance with an embodiment, the image-processing device 102 may use the second FG mask as a template to find a similar object in a next image frame of the sequence of image frames 112. Thus, the object 114, such as the human object, appearing in the sequence of image frames 112 may be dynamically segmented in real-time or near real-time as a result of quick and accurate determination of the second FG mask of the object.

In contrast to the conventional and common approach of foreground object segmentation by a pre-determined and completely static background image, the image-processing device 102 may not generate the completely static background image to initiate the segmentation process. The image-processing device 102 may be configured to constantly learn and/or update a nearly static background image and the depth values during the segmentation process. In this regard, the image-processing device 102 is configured to dynamically update the nearly static background image and the depth values. This relaxation from completely static to nearly static is useful because the object, such as a human, may not need to step out from the scene, during capture of the scene in the sequence of image frames 112. Further, even in instances where the image-capture device 104 may be accidentally displaced from its original position, it may not affect the FG mask correction and segmentation process.

Figure 2:
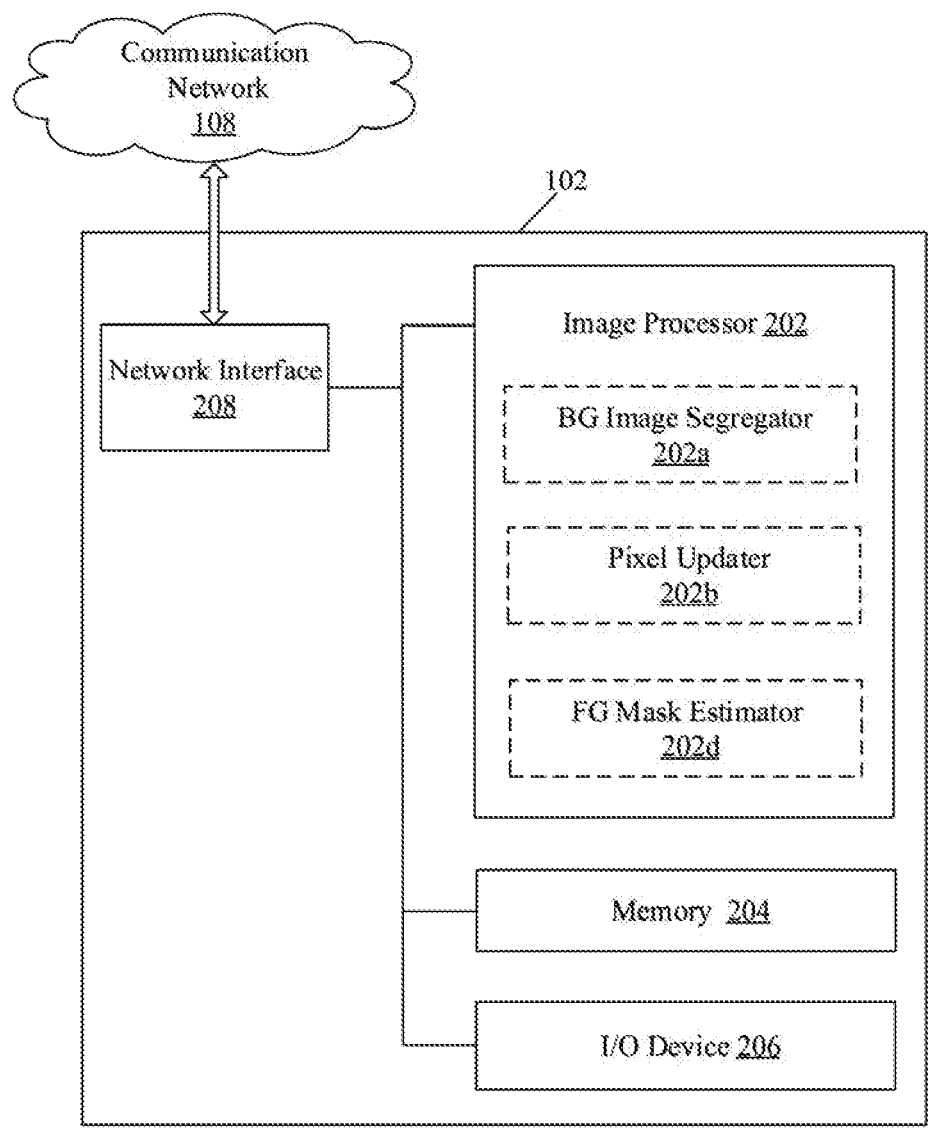
FIG. 2 is a block diagram that illustrates an exemplary image-processing device for foreground mask correction for object segmentation, in accordance with an embodiment of the disclosure.

FIG. 2 is a block diagram that illustrates an exemplary image-processing device for FG mask correction for object segmentation, in accordance with an embodiment of the disclosure. FIG. 2 is explained in conjunction with elements from FIG. 1. With reference to FIG. 2, the image-processing device 102 may include an image processor 202, a memory 204, one or more input/output (I/O) devices, such as an I/O device 206, and a network interface 208. The image-processing device 102 may further include one or more specialized processing units, such as a background (BG) image segregator 202a, a pixel updater 202b, and a foreground (FG) mask estimator 202c. The image processor 202 may be communicatively coupled to the memory 204, the I/O device 206, and the network interface 208. The network interface 208 may communicate with the image-capture device 104, and the display device 106, via the communication network 108, under the control of the image processor 202.

The image processor 202 may comprise suitable logic, circuitry, interfaces, and/or code that may be operable to execute a set of instructions stored in the memory 204. The image processor 202 may be configured to provide instructions to one or more specialized units to perform one or more specific operations. Examples of the image processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The BG image segregator 202a may comprise suitable logic, circuitry, interfaces, and/or code that may be configured to segregate the input image frame to the FG region and the BG region. The segregated BG region may correspond to the BG image. The BG image segregator 202a may binarize the difference between the input image frame and the BG image to estimate the first FG mask of the object. The BG image segregator 202a may execute BG image segregation based on one or more algorithms, such as frame differencing, Mean filter, Gaussian average, and Background mixture models.

The pixel updater 202b may comprise suitable logic, circuitry, interfaces, and/or code that may be configured to identify the first set of pixels with the first mask value to be updated to the second mask value in the boundary region of the estimated first FG mask. The first mask value and the second mask value may correspond to one of the FG mask value and the BG mask value.

The FG mask estimator 202c may comprise suitable logic, circuitry, interfaces, and/or code that may be configured to determine a second FG mask based on the identification of the first set of pixels in the boundary region of the estimated first FG mask. The one or more specialized processing units, such as the BG image segregator 202a, the pixel updater 202b, and the FG mask estimator 202c, may be implemented as a separate processor or circuitry in the image-processing device 102. In an embodiment, the one or more specialized processing units and the image processor 202 may be implemented as an integrated processor or a cluster of processors that perform the functions of the one or more specialized processing units and the image processor 202, collectively. In an embodiment, the one or more specialized processing units may be implemented as a set of instructions stored in the memory 204, which upon execution by the image processor 202, may perform the functions and operations of the image-processing device 102.

The memory 204 may comprise suitable logic, circuitry, and/or interfaces that may be configured to store a machine code and/or a set of instructions executable by the image processor 202, the BG image segregator 202a, the pixel updater 202b, and the FG mask estimator 202c. The memory 204 may be configured to store the received sequence of image frames, the FG region, the BG image, the first FG mask, depth information associated with the input image frame, the first set of pixels with its mask value, one or more FG mask correction parameters, the edge information derived from the input image frame, and the second FG mask. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may comprise suitable logic, circuitry, interfaces, and/or code that may be configured to receive an input from one or more users, such as the user 110. The I/O device 206 may be further configured to provide an output to the one or more users, such as the user 110. The I/O device 206 may comprise various input and output devices that may be operable to communicate with the image processor 202. Examples of the input devices may include, but are not limited to, a touch screen, physical input buttons, a joystick, a microphone, and/or a docking station. Examples of the output devices may include, but are not limited to, an-inbuilt or integrated display screen, a touch screen display, and/or a speaker.

The network interface 208 may comprise suitable logic, circuitry, interfaces, and/or code that may be configured to connect and communicate with an external display, such as the display device 106, via the communication network 108. The network interface 208 may implement known technologies to support wired or wireless communication with the communication network 108. The network interface 208 may include, but is not limited to, an antenna, a frequency modulation (FM) network interface, a radio frequency (RF) network interface, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions and/or operations performed by the image-processing device 102, as described in FIG. 1, may be performed by the image processor 202, and/or the one or more specialized processing units, such as the BG image segregator 202a, the pixel updater 202b, and the FG mask estimator 202c. Other operations performed by the image processor 202 and/or the one or more specialized processing units are further described, for example, in FIG. 3.

Figure 3:
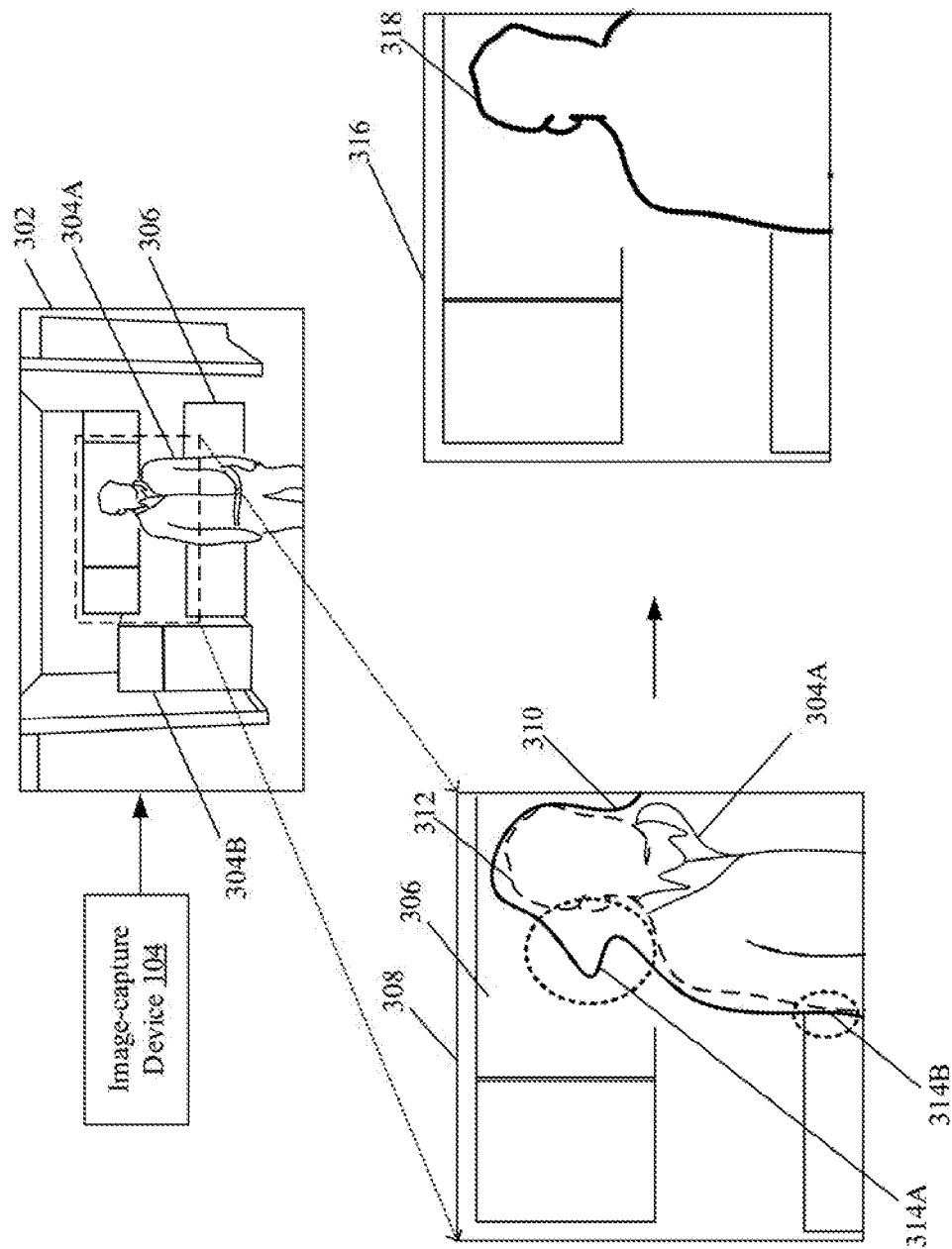
FIG. 3 is a detailed block diagram that illustrates an exemplary scenario for implementation of the disclosed image-processing device and method for foreground mask correction for object segmentation, in accordance with an embodiment of the disclosure.

FIG. 3 is a detailed block diagram that illustrates an exemplary scenario for implementation of the disclosed image-processing device and method for FG mask correction for object segmentation, in accordance with an embodiment of the disclosure. FIG. 3 is explained in conjunction with elements from FIGS. 1 and 2. With reference to FIG. 3, there is shown an input image frame 302 of a video captured by the image-capture device 104. The input image frame 302 may include a human object 304A, an inanimate object 304B, and a background (BG) region 306. There is further shown a first enlarged view 308 of a portion of the input image frame 302. The first enlarged view 308 depicts a first FG mask boundary 310 of a first FG mask around the human object 304A. There is also shown an ideal FG mask boundary 312 (represented as dashed lines) on the edges of the human object 304A, a first portion 314A of the first FG mask boundary 310 on an uniform area of the background 306, and a second portion 314B of the first FG mask boundary 310 of the first FG mask. A second enlarged view 316 of the portion of the input image frame 302 is shown with a second FG mask boundary 318 of a second FG mask of the human object 304A.

In operation, the image-capture device 104, such as a camera, may be configured to capture the sequence of image frames 112, such as the video. The input image frame 302 may be one of the captured sequence of image frames 112. The image processor 202 may receive the captured sequence of image frames 112 from the image-capture device 104, by network interface 208. The BG image segregator 202a may be configured to segment the input image frame 302 by partitioning the input image frame 302 into at least two regions, such as a FG region and the BG region 306. The segregated BG region 306 may also be referred to as the BG image of the input image frame 302. The segregated BG region 306 may be a partially static image. The partially static BG image may be periodically or aperiodically learnt or updated. Along with the partially static BG image, depth information associated with the input image frame 302 may also be periodically or aperiodically updated. The partially static BG image may eliminate the need of the human object 304A to step out from the scene captured by the image-capture device 104. In addition, the partially static BG image may also accommodate accidental displacement of the image-capture device 104.

The FG region may contain a plurality of objects therein, such as the human object 304A and the inanimate object 304B. The image processor 202 may be configured to remove one or more FG regions from the segregated FG region. For example, in an event that the object to be detected and segmented in the input image frame 302 is a human body, face detection and human body detection, or other type of recognition or detection technique may be utilized to reject the undesired FG regions, such as the inanimate object 304B, from the segregated FG region. This process may provide an initial rough estimate of a candidate FG human mask from among the one or more FG masks of the FG region.

The image processor 202 may be configured to estimate a first FG mask of the human object 304A having the first FG mask boundary 310 in the input image frame 302. In the event the BG pixel values, such as color components (red, green, and blue) and depth values, are available for almost an entire scene, the generation of the first FG mask may be initiated. The first FG mask may be estimated by binarizing a difference between the input image frame 302 and the BG image (such as the BG region 306) of the input image frame 302. Further, depth information associated with the input image frame 302 may be used for the estimation of the first FG mask. The image processor 202 selectively utilizes depth values for certain regions, where the depth values are considered reliable.

The first FG mask with the first FG mask boundary 310 may be an initial FG mask boundary, which may not coincide with the edges of the human object 304A. An ideal object boundary is one which coincides with the edges of the human object 304A. An example of the ideal object boundary, such as the ideal FG mask boundary 312 is shown on the edges of the human object 304A. Thus, the first FG mask with the first FG mask boundary 310 may be further processed to obtain an improved FG mask, such as the second FG mask with the second FG mask boundary 318. Each pixel in a boundary region of the estimated first FG mask may have a specific mask value, such as either a FG mask value or a BG mask value.

The pixel updater 202b may be configured to identify a first set of pixels with a first mask value to be updated to the second mask value in the boundary region, such as the first FG mask boundary 310, of the estimated first FG mask. The first mask value and the second mask value may correspond to one of the FG mask value and the BG mask value. For example, some pixels in the vicinity of the first FG mask boundary 310 of the estimated first FG mask may be misclassified for the mask value. It may be assumed that majority of the pixels, for example, at least more than 50% pixels, may be labeled correctly as FG or BG in the vicinity of the first FG mask boundary 310 of the estimated first FG mask. According to the assumption, statistical evaluation of the pixel mask value (also referred to as a label) may be performed to ascertain whether the mask value is correct or incorrect. The first set of pixels may have first incorrect mask value (such as BG), which is to be updated to the second mask value (such as FG) after FG mask correction. Likewise, the first set of pixels may have incorrect first mask value as FG, which is to be updated to the second mask value as BG after FG mask correction. Thus, all the pixels (identified as the first set of pixels) in the first FG mask with the misclassified mask values may need to be updated for correct mask values.

The first set of pixels may be identified by color components, a depth component, and a spatial position of each pixel associated with the boundary region, such as a region in the vicinity of the first FG mask boundary 310. The spatial position of a pixel associated with the boundary region may correspond to a vertical coordinate and a horizontal coordinate of the pixel. The identification of the first set of pixels may be further based on edge information derived from the input image frame 302. One or more FG mask correction parameters may be determined based on at least the edge information derived from the input image frame 302.

In accordance with an embodiment, the pixel updater 202b may be configured to apply a mean shift filter to each boundary pixel of the FG object boundary region for correction of mislabeled mask values associated with the estimated first FG mask. The mean shift filter may find modes (or peak) of a probability density function, and a mean shift vector pertaining to the mean shift filter may point toward the direction of maximum increase in the density. The mean shift vector may be iteratively traced or by application of the mean shift filter multiple times, such as 1 times, the nearest mode may be found. The mean shift filtering of the i-th pixel for i=1 to N may be executed according to given equation (1).

$$X_i^{(l+1)} = \frac{\sum_{n=1}^{N} X_n K_H(X_i^{(l)} - X_n^{(l)}) + \sum_{n=N+1}^{2N} X_n K_H(X_i^{(l)} - X_n)}{\sum_{n=1}^{n} K_H(X_i^{(l)} - X_n^{(l)}) + \sum_{n=N+1}^{2N} K_H(X_i^{(l)} - X_n)} \quad (1)$$

Where,
$X_i^{(l+1)}$ corresponds to a mean shift filter of the i-th pixel for i=1 to N;
$X_n$ corresponds to a plurality of sample vectors;
$K_H$ corresponds to multivariate Gaussian function; and $$\frac{\sum_{n=N+1}^{2N} X_n K_H(X_i^{(l)} - X_n)}{\sum_{n=N+1}^{2N} K_H(X_i^{(l)} - X_n)} = \text{Additional vectors } (AV).$$

The plurality of sample vectors $X_n$ are determined for the $n^{th}$ pixel, from the input image frame 302, the initially estimated first FG mask with the first FG mask boundary 310 for n=1 to N, and also from estimated partially static BG image (such as the segregated BG region 306) and depth for n=N+1 to 2N, as given in mathematical expression (2). In accordance with an embodiment, the iterative mean shift filtration process may be utilized to correct the initially estimated first FG mask with the first FG mask boundary 310.

$$X_n = \begin{bmatrix} R_n \\ G_n \\ B_n \\ D_n \\ h_n \\ w_n \\ f_n \end{bmatrix} \text{ for } n = N + 1, \text{ and} \quad (2)$$

$$X_n = \begin{bmatrix} R_n \\ G_n \\ B_n \\ D_n \\ h_n \\ w_n \\ 0 \end{bmatrix} \text{ for } n = N + 1 \text{ to } 2N;$$

Here, $f_n = 0$

Where,
Rn corresponds to red component; $G_n$ corresponds to green component;
$B_n$ corresponds to blue component; $D_n$ corresponds to depth component;
$h_n$ corresponds to height component; $w_n$ corresponds to width component; and
$f_n$ corresponds to mask value component.

Xn may be calculated by the color components, such as the RGB color components (Rn, $G_n$, and $B_n$), depth information, such as the depth component Dn, the spatial position of each pixel associated with the boundary region, such as the first FG mask boundary 310, and the mask value component of pixel "n". The spatial position of a pixel "n" associated with the boundary region corresponds to a vertical coordinate, such as the height component $h_n$, and a horizontal coordinate, such as the width component $w_n$ of the $n^{th}$ pixel. In the first FG mask correction phase, the mask value $f_n$ is the component that is to be corrected by the color values (RGB), the depth (D), and the pixel's spatial position (h,w). The mask value $f_n$ may be binary, for example 0=BG and 1=FG. The mask value may also be referred to as FG mask flag or pixel FG/BG label. The mask value $f_n$ for n=N+1 to 2N for the estimated partially static BG image (such as the segregated BG region 306) may be set to zero (0), as it is known that all pixels in the segregated BG region 306 belongs to BG.

In accordance with an embodiment, the mean shift filter may utilize the additional vectors (AV) from the estimated partially static BG image, such as the segregated BG region 306 and depth. In the given mathematical expression (2), for n=N+1 to 2N, the sample plurality of vectors $x_n$ may be included in mean shift filter, where all the components (R, G, B, h, w, and D) are from the estimated partially static BG image and depth values, and a mask value of each pixel in the partially static BG image is zero. These additional vectors (AV) effectively aid in correction of the pixels' mask values that are initially mislabeled as FG (where pixels' mask values are actually BG).

The image processor 202 may be configured to identify a first set of pixels with a first mask value to be updated to the second mask value in the boundary region of the estimated first FG mask. The first mask value and the second mask value may correspond to one of the FG mask value (FG=1) or the BG mask value (BG=0). The first set of pixels initially misclassified with the first mask value may be identified iteratively by a mean shift filtration process by the equation (1). The identification of the first set of pixels with the first mask value to be updated to the second mask value in the boundary region of the estimated first FG mask, may be referred to as a correction phase to correct the mislabeled mask values associated with the estimated first FG mask.

In order to reduce the computational load of the first FG mask correction, the mean shift filter by the equation (1) may be applied specifically to certain number of pixels next to the FG/BG boundary, such as the first FG mask boundary 310, instead of the entire FG region of the input image frame 302. For example, for each boundary pixel "n", the plurality of sample vectors $x_n$ are used in a small region of interest, for example, a specified window size of "11×11"-pixel may be used, so that the total number of samples (N) may be reduced, such as (N=121). The total number of samples (N) indicates the total number of pixels that are to be evaluated for identification of pixels with the misclassified first mask value to be updated to the second mask value.

In accordance with an embodiment, the mask value $f_n$ for pixels in the specified window size may be corrected by the given equation (3). The mask value $f_n$ for pixels in the specified window size may be corrected in the initially estimated first FG mask in the iterative mean shift filtration process for the equation (1).

$$X_i^{(l+1)} = \begin{bmatrix} R_i^{(l+1)} \\ G_i^{(l+1)} \\ B_i^{(l+1)} \\ D_i^{(l+1)} \\ h_i^{(l+1)} \\ w_i^{(l+1)} \\ f_i^{(l+1)} \end{bmatrix}, \quad (3)$$

Where,
$f_i^{(l+1)}$ is corrected, and where if $f_i^{(l+1)} > 0.5$, then mask value=1, else 0.

In accordance with an embodiment, the boundary region, such as the first FG mask boundary 310, of the first FG mask may be smoothed by applying morphological closing and opening operation to the mask value ($f_n$) component. For example, a suitable shape (contour) of a kernel function, such as the multivariate Gaussian kernel function $K_H$, may be selected. In an event a wider kernel is selected, the mean shift filter may have more smoothing capability as compared to a small size kernel. The pixel updater 202b may be configured to select the kernel function with a first specified dimension for smoothing of the first FG mask of the human object 304A. The kernel function with the first specified dimension may be selected in an event that a certain portion, such as the first portion 314A, of the estimated first FG mask is located in a uniform background region, such as a flat area, in the input image frame 302. The selection of the kernel function with the first specified dimension for smoothing of the first FG mask may be performed to enable the first portion 314A of the estimated first FG mask to coincide with corresponding edges of the human object 304A derived from the input image frame 302. For example, the first portion 314A of the estimated first FG mask may deviate from the edges of the human object 304A, such as away from the ideal FG mask boundary 312, as shown. Alternatively, the kernel function with a second specified dimension (a small kernel) may be selected for smoothing of the first FG mask in an event that a certain portion, such as the second portion 314B, of the estimated first FG mask almost coincide with corresponding edges of the human object 304A derived from the input image frame 302, as shown. For example, the second portion 314B of the estimated first FG mask may almost coincide on the edges of the human object 304A similar to the ideal FG mask boundary 312 that corresponds to the second portion 314B, as shown. The first specified dimension may be greater than the second specified dimension. The mean shift filter may have more smoothing capability for the kernel function with the first specified dimension as compared to the kernel function with the second specified dimension so that boundary regions, such as the first portion 314A, of the estimated first FG mask located in the uniform region, are smoothed effectively. As a result of the correction of the mislabeled mask values for pixels next to the FG/BG boundary in the specified window size, the second FG mask of the human object 304A may be quickly and accurately determined with reduced computational load on the image processor 202.

The FG mask estimator 202c may be configured to determine the second FG mask with the second FG mask boundary 318 based on the identification of the first set of pixels in the FG object boundary region, such as the first FG mask boundary 310, of the estimated first FG mask. The second FG mask may be determined based on the smoothing of the first FG mask of the human object 304A. The second enlarged view 316 of the portion of the input image frame 302 depicts the second FG mask boundary 318 of the second FG mask of the human object 304A. The human object 304A that appears in the input image frame 302 and subsequent image frames of the sequence of image frames that are captured by the image-capture device 104, may be dynamically segmented in real-time or near real-time by the determined second FG mask of the human object 304A.

In accordance with an embodiment, the image processor 202 may be configured to render the second FG mask on the output device, such as the display screen of the image-processing device 102. Alternatively, the image processor 202 may be configured to transmit the determined second FG mask to the display device 106, via the communication network 108. The display device 106 may be configured to render the second FG mask segmented out from the background 306 of the captured video in real time or near-real time.

Figure 4:
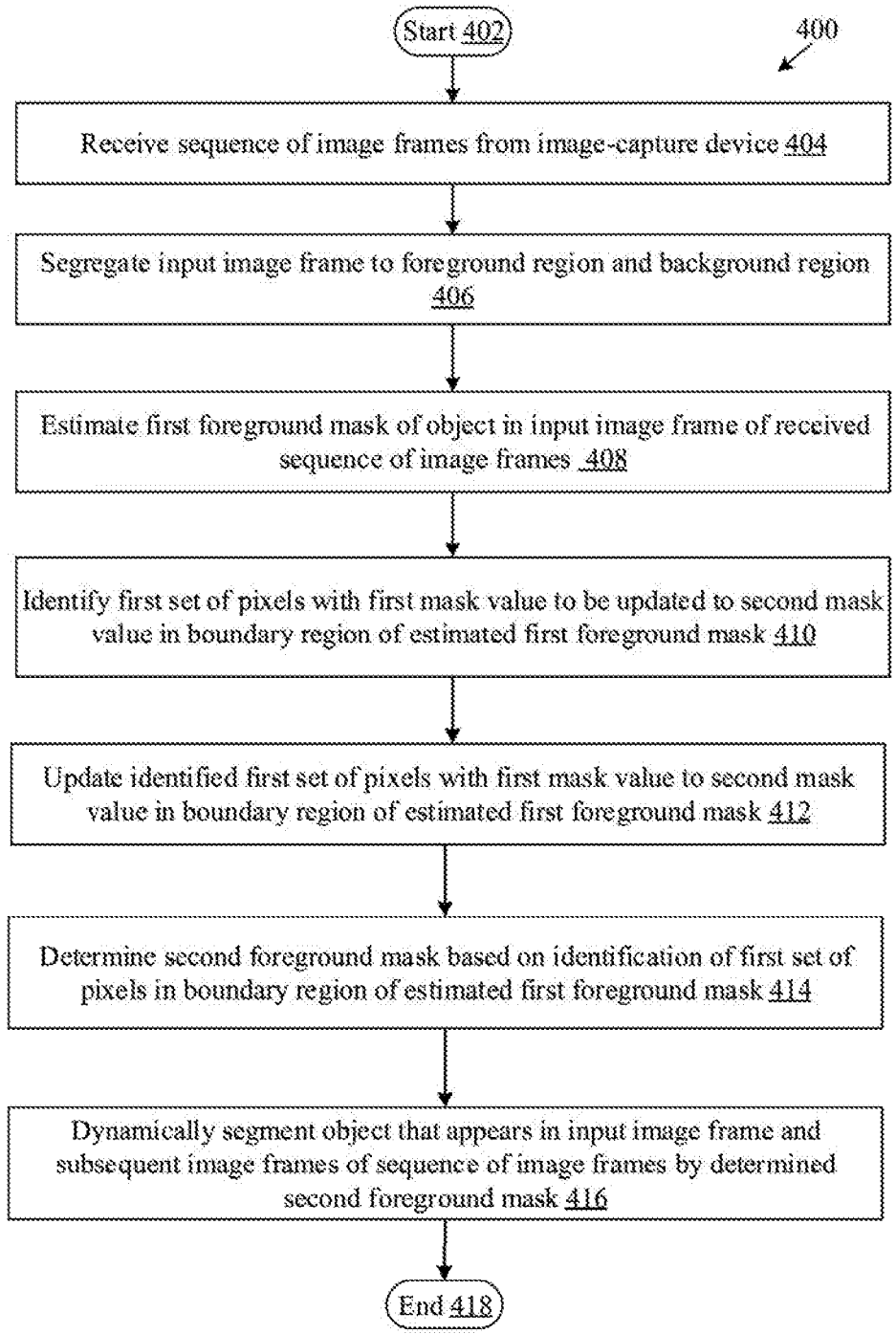
FIG. 4 is a flowchart that illustrates exemplary operations for foreground mask correction for object segmentation, in accordance with an embodiment of the disclosure.

FIG. 4 is a flowchart that illustrates an exemplary method for foreground mask correction for object segmentation, in accordance with an embodiment of the disclosure. With reference to FIG. 4, there is shown a flowchart 400. The flowchart 400 is described in conjunction with FIGS. 1 to 3. The method, implemented in the image-processing device 102, starts at 402 and proceeds to 414.

At 404, a sequence of image frames may be received from the image-capture device 104. The image processor 202 may receive the captured sequence of image frames from the image-capture device 104, by the network interface 208. At 406, an input image frame, such as the input image frame 302, may be segregated to a foreground region and a background region, such as the BG region 306. The input image frame may be one of the captured sequence of image frames. The segregated BG region may also be referred to as the BG image of the input image frame.

At 408, a first FG mask of an object, such as the human object 304A, may be estimated in the input image frame of the received sequence of image frames. The first FG mask may be estimated by depth information associated with the input image frame and by binarizing a difference between the input image frame and the BG image of the input image frame. Each pixel in a boundary region, such as the first FG mask boundary 310, of the estimated first FG mask may have a specific mask value, such as either a FG mask value or a BG mask value.

At 410, a first set of pixels may be identified with a first mask value to be updated to a second mask value in the boundary region of the estimated first FG mask. The first set of pixels may be identified by color components, a depth component, and a spatial position of each pixel associated with the boundary region, such as a region in the vicinity of the first FG mask boundary 310. The first set of pixels initially misclassified with the first mask value may be identified iteratively by a mean shift filtration process by the equation (1). The identification of the first set of pixels with the first mask value to be updated to the second mask value in the boundary region of the estimated first FG mask, may be referred to as a correction phase to correct the mislabeled mask values associated with the estimated first FG mask. For example, the mask value $f_n$ is the component that is to be corrected by the color values (RGB), the depth (D), and the pixel's spatial position (h,w) in the first FG mask correction phase.

At 412, the identified first set of pixels with the first mask value may be updated to the second mask value in the boundary region of the estimated first FG mask. The mask value $f_n$ for pixels in the specified window size may be corrected by the given equation (3). The pixel updater 202*b* may be configured to apply a mean shift filter to each boundary pixel of the FG object boundary region for correction and update of mislabeled mask values associated with the estimated first FG mask.

At 414, a second FG mask may be determined based on identification of the first set of pixels in the boundary region of the estimated first FG mask. For example, the FG mask estimator 202*c* may be configured to determine the second FG mask with the second FG mask boundary 318 based on the identification of the first set of pixels in the FG object boundary region, such as the first FG mask boundary 310, of the estimated first FG mask.

At 416, an object, such as the human object 304A, that appears in the input image frame and subsequent image frames of the sequence of image frames may be dynamically segmented. The segmentation may be executed in real-time or near real-time by the determined second FG mask of the object. The control passes to end 418.

In accordance with an embodiment of the disclosure, an image-processing device, such as the image-processing device 102, may comprise one or more circuits, such as the image processor 202, the BG image segregator 202*a*, the pixel updater 202*b*, and the FG mask estimator 202*c* (FIG. 2). The image processor 202 may be configured to receive a sequence of image frames captured by the image-capture device 104 (FIG. 1). The image processor 202 may be configured to estimate a first FG mask of an object in an input image frame of the received sequence of image frames. The first FG mask may be estimated by depth information associated with the input image frame and by binarizing a difference between the input image frame and a BG image of the input image frame. The pixel updater 202*b* may be configured to identify a first set of pixels with a first mask value to be updated to a second mask value in a boundary region of the estimated first FG mask. The FG mask estimator 202*c* may be configured to determine a second FG mask based on at least the identification of the first set of pixels in the boundary region of the estimated first FG mask.

The image-processing device 102 may be implemented in various application areas, such as video surveillance or tracking for moving objects, deforming objects (non-rigid deformations), or objects that change orientations at different time instances while an input video is captured. The disclosed image-processing device 102 and method may be suited for a real-world tracking application, such as video surveillance of car tracking for autonomous navigation, a gaming system, or other real time or near-real time object detection and segmentation for such moving objects.

In accordance with an exemplary aspect of the disclosure, the image-processing device 102 may be a video surveillance system. Thus, all the operations executed by the image-processing device 102 as described in the present disclosure, for example, in FIGS. 1 to 4, may also be executed by the video surveillance system. For example, the video surveillance system may receive the sequence of image frames captured by the image-capture device 104 to be processed for real time tracking and segmentation of an object, such as the human object 304A, by the determined second FG mask. An example of the object segmentation is shown and described in FIG. 3.

In accordance with another exemplary aspect of the disclosure, the image-processing device 102 may be a gaming system. Thus, all the operations executed by image-processing device 102 as described in the present disclosure, may also be executed by the gaming system. For example, the gaming system may present a gaming character, such as the segmented human object 304A, in a gaming environment to emulate a player within a game scene. The accurately segmented human object 304A by the determined second FG mask, may then be used with a different background of users choice. A monochrome blue screen may not be required as background for the object segmentation. Further, as a result of the correction of the mislabeled mask values for pixels next to the FG/BG boundary in the specified window size, the second FG mask of the human object 304A may be quickly and accurately determined. Such accurately segmented human object 304A in a video may be rendered on a cut-to-shape type of display screen or a transparent display screen to increase realism and emulate or provide a three dimensional (3D) effect on a two dimensional (2D) display screen.

In contrast to the conventional and common approach of foreground object, such as the human object 304A, segmentation by a pre-determined and completely static background image, the image-processing device 102 may not generate the completely static background image to initiate the segmentation process. The BG image segregator 202*a* constantly learns or updates a nearly static background image and the depth values received from a depth sensor of the one or more sensors of the I/O device 206 throughout the segmentation process. This relaxation from completely static to nearly static may be advantageous because the human object 304A may not need to move out from the scene, at the time of capture the scene. Further, even if the image-capture device 104 is accidentally displaced from its original position at the time of capture of the sequence of mage frames (video), it may not affect the automatic segmentation process.

In another conventional technique of a real-time video segmentation, a color image and its depth field may be captured simultaneously. A database of human body masks may be created offline, where names of the human body parts may be labeled (such as, head, neck, shoulder, chest, arm, elbow, hand, stomach, hip, leg, knee, and foot). Further, depth information of the human body for a numerous different postures may also be captured. Every time a depth field is captured, such conventional method may scan through various local areas of the captured depth field, and check if there are any good matches for the human postures stored in the database. In an event a strong match is found, the conventional method may then roughly compute the range of depth where the human body is present. Thus, binarizing the depth field by the depth range information may provide a human object mask. Such conventional techniques of real-time video segmentation are depth-based methods. In contrast to such depth-based methods, the image processor 202, and its specialized one or more circuits, does not depend heavily on the depth values to segment a foreground object, such as the human object 304A. Due to severe noise present in most depth sensors, the boundaries of the foreground regions obtained relying heavily on depth values are often not smooth (not acceptable for precise object segmentation).

Another advantage of the image-processing device 102 is that the mean shift filter by equation (1) is applied specifically to certain number of pixels next to the FG/BG boundary of the boundary region instead of the entire FG region of an input image of the sequence of image frames. For example, for each boundary pixel "n", the plurality of sample vectors $x_n$ are used in a small region of interest, for example, a specified window size of "11×11"-pixel may be used, so that the total number of samples (N) may be reduced, such as (N=121). As a result of the correction of the mislabeled mask values for pixels next to the FG/BG boundary in the specified window size, the second FG mask of the object may be quickly and accurately determined with reduced computational load on the image-processing device 102. Thus, the operations performed by the image-processing device make the image-processing device 102 itself more robust in object detection and segmentation as compared to conventional methods of image/video segmentation. The one or more circuits, such as the image processor 202, the BG image segregator 202a, the pixel updater 202b, and the FG mask estimator 202c, enables the image-processing device 102 to find desired objects, such as the human object 304A, and segment them out in real time or near real time in a fully-automatic manner (with no user input). The result, such as the segmented object, is produced immediately after a new image of the input video is captured. Once the segmentation process is started, the image processor 202 iteratively corrects the initial FG mask to obtain an ideal FG mask, such as the ideal FG mask boundary 312, the whose boundary coincides on the edges of the human object 304A, as shown in FIG. 3. Consequently, the boundary of the second FG mask also coincides on the edges of the human object 304A, thereby providing a capability to the image-processing device 102 to accurately segment a desired object, such as the human object 304A, from the background by itself.

Various embodiments of the disclosure may provide a non-transitory, computer-readable medium and/or storage medium, and/or a non-transitory machine readable medium and/or storage medium stored thereon, a set of instructions executable by a machine and/or a computer for image processing to correct foreground mask for object segmentation. The set of instructions may cause the machine and/or computer to perform the operations that comprise receipt of a sequence of image frames from the image-capture device 104. A first foreground (FG) mask of an object may be estimated in an input image frame of the received sequence of image frames. The first FG mask may be estimated using depth information associated with the input image frame and by binarizing a difference between the input image frame and a background (BG) image of the input image frame. A first set of pixels may be identified with a first mask value to be updated to a second mask value in a boundary region of the estimated first FG mask. The first set of pixels may be identified using color components, a depth component, and a spatial position of each pixel associated with the boundary region. A second FG mask may be determined based on at least the identification of the first set of pixels in the boundary region of the estimated first FG mask.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image-processing device, comprising:
   one or more circuits configured to:
   receive a sequence of image frames from an image capture device;
   segregate an input image frame of said received sequence of image frames into a foreground region and a background region;
   detect, based on at least one of a face detection or a human body detection technique, at least one foreground (FG) region to be removed from said segregated foreground region;
   estimate a first foreground (FG) mask of an object in said input image frame based on each of depth information associated with said input image frame, binarization of a difference between said input image frame and a background (BG) image of said input image frame, and said detected at least one FG region;
   identify a first set of pixels with a first mask value, wherein said first set of pixels are updated from the first mask value to a second mask value in a boundary region of said estimated first FG mask; and
   determine a second FG mask based on at least said identification of said first set of pixels in said boundary region of said estimated first FG mask.

2. The image-processing device according to claim 1, wherein each of said first mask value and said second mask value corresponds to one of a FG mask value and a BG mask value.

3. The image-processing device according to claim 1, wherein said segregated background region corresponds to said BG image.

4. The image-processing device according to claim 1, wherein said one or more circuits are further configured to identify said first set of pixels based on color components, a depth component, and a spatial position of each pixel associated with said boundary region.

5. The image-processing device according to claim 1, wherein said one or more circuits are further configured to:
   derive edge information from said input image frame;
   determine at least one FG mask correction parameter based on said edge information; and
   identify said first set of pixels with said first mask value based on said edge information.

6. The image-processing device according to claim 1, wherein said one or more circuits are further configured to estimate said first FG mask of said object based on a threshold value of said binarized difference between said input image frame and said BG image of said input image frame.

7. The image-processing device according to claim 1, wherein said one or more circuits are further configured to apply a mean shift filter to each boundary pixel of said boundary region for correction of mislabeled mask values associated with said estimated first FG mask.

8. The image-processing device according to claim 7, wherein said one or more circuits are further configured to apply said mean shift filter based on a plurality of sample vectors in a specified window size in a vicinity of said boundary region, and wherein said plurality of sample vectors corresponds to color components, a depth component, and a spatial position of each pixel associated with said boundary region.

9. The image-processing device according to claim 1, wherein said one or more circuits are further configured to:
select, based on a first portion of said estimated first FG mask, a kernel function with a first dimension to smooth said first FG mask of said object,
wherein said first portion is in a uniform region in said input image frame; and
enable, based on said selection, said first portion of said estimated first FG mask to coincide with corresponding edges of said object derived from said input image frame.

10. The image-processing device according to claim 1, wherein said one or more circuits are further configured to select a kernel function with a second dimension based on a second portion, of said estimated first FG mask, that coincides with corresponding edges of said object in said input image frame.

11. The image-processing device according to claim 1, wherein a spatial position of a pixel associated with said boundary region corresponds to a vertical coordinate and a horizontal coordinate of said pixel.

12. The image-processing device according to claim 1, wherein said one or more circuits are further configured to segment, based on said determined second FG mask, said object that appears in said sequence of image frames in real-time or near real-time.

13. The image-processing device according to claim 12, wherein said one or more circuits are further configured to periodically or aperiodically update said BG image during said segmentation.

14. A method, comprising:
in an image-processing device:
receiving a sequence of image frames from an image capture device;
segregating an input image frame of said received sequence of image frames into a foreground region and a background region;
detecting, based on at least one of a face detection or a human body detection technique, at least one foreground (FG) region to be removed from said segregated foreground region;
estimating a first foreground (FG) mask of an object in said input image frame based on each of depth information associated with said input image frame, binarization of a difference between said input image frame and a background (BG) image of said input image frame, and said detected at least one FG region;
identifying, a first set of pixels with a first mask value, wherein said first set of pixels are updated from the first mask value to a second mask value in a boundary region of said estimated first FG mask; and
determining, a second FG mask based on at least said identification of said first set of pixels in said boundary region of said estimated first FG mask.

15. The method according to claim 14, further comprising identifying said first set of pixels based on color components, a depth component, and a spatial position of each pixel associated with said boundary region.

16. The method according to claim 14, further comprising applying a mean shift filter to each boundary pixel of said boundary region for correction of mislabeled mask values associated with said estimated first FG mask.

17. The method according to claim 14, further comprising selecting, based on a first portion of said estimated first FG mask, a kernel function with a first dimension for smoothing of said first FG mask of said object, wherein said first portion is in a uniform region in said input image frame.

18. The method according to claim 14, further comprising selecting a kernel function with a second dimension based on a second portion, of said estimated first FG mask, that coincides with corresponding edges of said object in said input image frame.

19. The method according to claim 14, further comprising segmenting, based on said determined second FG mask, said object appearing in said sequence of image frames in real-time or near real-time.

20. An image-processing device, comprising:
one or more circuits configured to:
receive a sequence of image frames from an image capture device;
estimate a first foreground (FG) mask of an object in an input image frame based on each of depth information associated with said input image frame and binarization of a difference between said input image frame and a background (BG) image of said input image frame;
identify a first set of pixels with a first mask value, wherein said first set of pixels are updated from the first mask value to a second mask value in a boundary region of said estimated first FG mask;
determine a second FG mask based on at least said identification of said first set of pixels in said boundary region of said estimated first FG mask; and
apply a mean shift filter to each boundary pixel of said boundary region for correction of mislabeled mask values associated with said estimated first FG mask.

21. An image-processing device, comprising:
one or more circuits configured to:
receive a sequence of image frames from an image capture device;
estimate a first foreground (FG) mask of an object in an input image frame based on each of depth information associated with said input image frame and binarization of a difference between said input image frame and a background (BG) image of said input image frame;
identify a first set of pixels with a first mask value, wherein said first set of pixels are updated from the first mask value to a second mask value in a boundary region of said estimated first FG mask;
determine a second FG mask based on at least said identification of said first set of pixels in said boundary region of said estimated first FG mask; and select, based on a first portion of said estimated first FG mask, a kernel function with a first dimension to smooth said first FG mask of said object,
wherein said first portion is in a uniform region in said input image frame.

\* \* \* \* \*